United States Patent
Fenyes

[11] 3,867,540
[45] Feb. 18, 1975

[54] 1-(POLYHALOAKYLTHIO) INDAZOLES AS FUNGICIDAL AND BACTERICIDAL AGENTS

[75] Inventor: Joseph G. E. Fenyes, Oakland, Calif.

[73] Assignee: Chevron Research Company, San Francisco, Calif.

[22] Filed: Dec. 21, 1967

[21] Appl. No.: 705,586

Related U.S. Application Data

[62] Division of Ser. No. 579,512, Sept. 15, 1966, Pat. No. 3,647,818.

[52] U.S. Cl. .............................................. 424/273
[51] Int. Cl. .......................................... A01n 9/22
[58] Field of Search .................. 167/33 D; 424/273; 260/310 B

[56] References Cited
UNITED STATES PATENTS

| | | | |
|---|---|---|---|
| 2,553,770 | 5/1951 | Kittleson | 260/309.5 |
| 2,553,775 | 5/1951 | Hawley et al. | 260/309.5 |
| 2,844,628 | 7/1958 | Kuhle et al. | 167/33 D |
| 2,888,462 | 5/1959 | Cannon | 260/310 C |
| 3,178,447 | 4/1965 | Kohn | 260/309.5 |

Primary Examiner—Frederick E. Waddell
Attorney, Agent, or Firm—G. F. Magdeburger; John Stoner, Jr.; Raymond Owyang

[57] ABSTRACT

Indazoles of the formula:

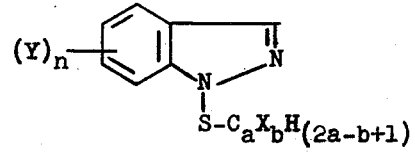

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 or nitro in positions 4 to 6 of the indazole nucleus and $n$ is an integer from 0 to 1. These compounds are fungicidal and bactericidal.

10 Claims, No Drawings

1-(POLYHALOAKYLTHIO) INDAZOLES AS FUNGICIDAL AND BACTERICIDAL AGENTS

CROSS REFERENCE TO RELATED APPLICATIONS

This application is a divisional of copending application Ser. No. 579,512, filed Sept. 15, 1966, now U.S. Pat. No. 3,647,818.

This invention is directed to 1-(polyhaloalkylthio) indazoles and their use as pesticides.

The unique indazoles of this invention are 1-polyhaloalkylthio indazoles in which the polyhaloalkylthio group contains 1 to 2 carbon atoms and has 3 to 5 halogens of atomic number of 17 to 35, i.e., chlorine or bromine, at least one of said halogens being bonded to the carbon atom which is bonded to the sulfur and the indazole nucleus has 0 to 1 nitro or halogen substituents in positions 4 to 6 of the indazole nucleus. These compounds may be represented by the general formula

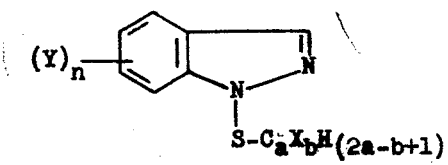

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 or nitro in positions 4 to 6 of the indazole nucleus and $n$ is an integer from 0 to 1. Preferably, X is chlorine, $a$ is 2 and $b$ is 4.

Examples of compounds having the above formula are 1-(trichloromethylthio) indazole, 1-(tribromomethylthio) indazole, 1-(trichloromethylthio)-4-nitroindazole, 1-(trichloromethylthio)-5-chloroindazole, 1-(1',2'-dibromo-1',2'-dichloroethylthio) indazole, 1-(perchloroethylthio) indazole, 1-(1',2',2'-trichloroethylthio) indazole, 1-(1',1',2',2'-tetrachloroethylthio) indazole, 1-(1',1',2',2'-tribromoethylthio) indazole, 1-(1',1',2',2'-tetrachloroethylthio)-5-nitroindazole, 1-(1',1',2',2'-tetrachloroethylthio)-6-bromoindazole and 1-(1',1',2',2'-tetrachloroethylthio)-4-chloroindazole.

These novel indazoles may be made by reacting an appropriate polyhaloalkylsulfenyl halide with indazole or a suitably substituted indazole. If desired, the alkali metal salt of indazole may be used. The reaction may be carried out in an aqueous medium or in an organic solvent such as ether, hexane or benzene. If an organic solvent is used, a hydrogen halide acceptor, such as a tertiary amine, must be present. The 1-(polyhaloalkylthio) indazole may be separated from the reaction mixture by conventional methods such as recrystallization. They are solids which are soluble in organic solvents such as acetone, benzene, ether and the like.

The following examples illustrate specific methods by which the compounds of this invention may be prepared. These examples are offered as illustrative only and are not meant to limit the invention as described herein. Unless otherwise indicated, percentages are by weight.

EXAMPLE 1

8.1 g. of 5-nitroindazole, 10.0 ml. of 1,1,2,2-tetrachloroethylsulfenyl chloride and 100 ml. chloroform were added to 50 ml. water in a flask. 5 ml. of acetone were added to this mixture and it was stirred at room temperature for about 18–19 hours. The aqueous layer was then separated from the organic layer and discarded. The organic layer was washed consecutively with dilute aqueous hydrochloric acid and water and then dried over anhydrous magnesium sulfate. The solution was then filtered and stripped under reduced pressure. The solid residue was washed with hexane and then dried to give 16.5 g. of 1-(1',1',2',2'-tetrachloroethylthio)-5-nitroindazole. This compound melted at 121°–123°C. and had the following analysis: Found-Cl 40.1%, S 8.55%; Calculated-Cl 39.28%, S 8.88%.

EXAMPLE 2

Using the general method described in Example 1, 1-(1',1',2',2'-tetrachloroethylthio)-6-nitroindazole was prepared using 6-nitroindazole instead of 5-nitroindazole. This compound melted at 125°–127°C. and had the following analysis: Found-Cl 38.75%, S 8.73%; Calculated-Cl 39.28%, S 8.88%.

EXAMPLE 3

By the general method described in Example 1, 1-(1',1',2',2'-tetrachloroethylthio)-5-chloroindazole was prepared using 5-chloroindazole instead of 5-nitroindazole. It melted at 97°–98.5°C. and had the following analysis: Found-Cl. 50.70%, S 9.88%; Calculated-Cl. 50.58%, S 9.15%.

EXAMPLE 4

5.0 g. of 5-chloroindazole were suspended in 100 ml. chloroform in a flask. 50 ml. of water and 7 ml. trichloromethylsulfenyl chloride were added to this suspension. The total mixture was stirred at ambient temperature for 6½ hours and then allowed to stand overnight. The chloroform layer was separated from the aqueous layer. The chloroform layer was washed twice with dilute HCl, twice with water and then dried over anhydrous magnesium sulfate. After drying the layer was filtered and the chloroform was evaporated off under reduced pressure. A solid formed. It was washed with mixed hexanes and then dried to give 5.5 g. 1-(trichloromethylthio)-5-chloroindazole. It melted at 103°–105°C. and had the following analsis: Found-Cl 47.15%, S 10.62%; Calculated-Cl 46.96%, S 10.60%.

The indazoles of this invention have excellent biological activity, especially against fungi and bacteria. As a group their activity is in general superior to N-polyhaloalkylthio pyrazoles.

Indazoles of this invention were tested as fungicides by means of the mycelial drop test. This test measures the fungitoxicity of a compound in terms of its inhibition of fungus mycelial growth. Each indazole was dissolved in acetone to a 500 ppm concentration. Equal volumes of this solution were applied to the centers of each of three replicate paper discs inoculated with the desired fungus mycelium and placed on potato-dextrose agar medium. Following this application the discs were incubated along with inoculated but untreated control discs at ambient temperatures until the control discs were filled with mycelial growth. The fungicidal activity of the indazole was determined by comparing the radii of mycelial growth away from the edges of the treated and control discs. From this comparison a percent inhibition based on the relative mycelial growth areas was determined. The results of these tests are reported in Table I.

hosts these pathogens. They may be applied with appropriate inert carriers and diluents as powders, solutions or dispersions. Pesticidal formulations of these indazoles may also contain stabilizers, spreading agents, wetting agents, stickers and other compatible pesticides.

TABLE I

| Compound | % Inhibition | | | |
| --- | --- | --- | --- | --- |
| | Pythium Ultimum | Helminthosporium sativum | Fusarium oxysporum | Rhizoctonia solani |
| 1-(1',1',2',2'-tetrachloroethylthio)-6-nitroindazole | 100 | 100 | 100 | 100 |
| 1-(1',1',2',2'-tetrachloroethylthio)-5-chloroindazole | 97 | 100 | 98 | 100 |
| 1-(1',1',2',2'-tetrachloroethylthio)-5-nitroindazole | 100 | 100 | 100 | 100 |
| 1-(trichloromethylthio)-5-chloroindazole | 100 | 100 | 78 | 100 |

Indazoles of this invention were also tested as bactericides. The test method involved contacting a dilute bacterial suspension with the indazole in an aqueous bacterial medium and was carried out as follows: Bacterial medium was made by mixing 21.5 g. dehydrated Emerson's Broth (beef peptone, glysate, sodium chloride, yeast extract and dextrose) in 900 ml. distilled water. The bacterial suspension was made by preparing 21.5 g. dehydrated Emerson's Broth in one l. distilled water, inoculating the broth with the desired bacteria, incubating the culture and diluting the broth culture tenfold with sterilized water. 9.0 ml. of the medium was put in a vial. The vial was capped and autoclaved at 17 psi for 20 minutes to ensure aseptic conditions. 0.9 ml. of bacterial suspension diluted with water to the same turbidity (measured with a spectrophotometer) as the medium and 50 ml. of an acetone solution of the indazole at the desired concentration were added to the vial.

The vial's contents were then incubated at 23°–24°C. for 40–48 hours. Photometric readings of the vial were made after this period to determine the turbidity of the vial. Similar readings were made on an untreated control sample. Percent inhibition of bacterial growth was determined by the following formula % Inhibition = (% light blocked on test/% light blocked on control) × 100

The test results are reported in Table II.

I claim:
1. A fungicidal composition comprising a fungitoxic amount of an indazole of the formula

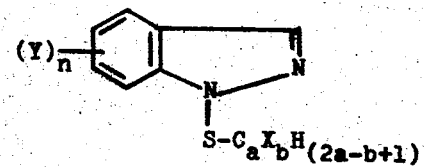

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 in positions 4 to 6 of the indazole nucleus and $n$ is an integer from 0 to 1 and an inert carrier therefor.

2. A method for controlling fungi which comprises applying a fungitoxic amount of an indazole of the formula

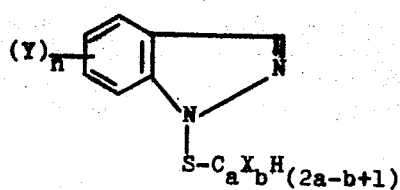

TABLE II

| Compound | Concentration ppm | % Inhibition | | | |
| --- | --- | --- | --- | --- | --- |
| | | A | C | E | P |
| 1-(1',1',2',2'-tetrachloroethylthio)-6-nitro indazole | 10 | 100 | 100 | 100 | 100 |
| | 3 | 97 | 100 | 100 | 96 |
| | 1 | 83 | 82 | 17 | 76 |
| 1-(1',1',2',2'-tetrachloroethylthio)-5-nitro indazole | 10 | 100 | 100 | 100 | |
| | 3 | 100 | 100 | 100 | 96 |
| | 1 | 83 | 63 | 89 | 85 |

A = Agrobacteria tumafaciens
C = Corynebacteria michiganense
E = Erwinia carotovora
P = Pseudomonas syringae Aside from the specific methods shown above, these indazoles may be applied by conventional methods in fungitoxic and bactericidally effective amounts to fungal and bacterial pathogens or to environments which wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 in positions 4 to 6 of the indazole nucleus and $n$ is an integer from 0 to 1 to the fungi.

3. A method for controlling bacteria which comprises applying a bactericidally effective amount of an indazole of the formula

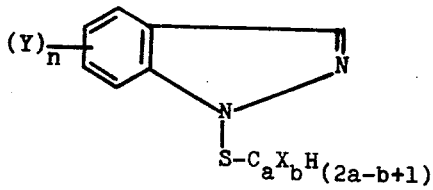

wherein $a$ is 1 or 2, $b$ is 3 when $a$ is 1 and is from 3 to 5 when $a$ is 2, X is halogen of atomic number from 17 to 35 with at least one X being bonded to the carbon atom which is bonded to the sulfur atom, Y is halogen of atomic number from 17 to 35 in positions 4 to 6 of the indazole nucleus and $n$ is an integer from 0 to 1 to said bacteria.

4. The fungicidal composition of claim 1 wherein X is chlorine, $a$ is 1 or 2 and $b$ is 3 when $a$ is 1 and 4 when $a$ is 2.

5. The method of claim 2 wherein X is chlorine, $a$ is 1 or 2 and $b$ is 3 when $a$ is 1 and 4 when $a$ is 2.

6. The method of claim 3 wherein X is chlorine, $a$ is 1 or 2 and $b$ is 3 when $a$ is 1 and 4 when $a$ is 2.

7. The fungicidal composition of claim 1 wherein $a$ is 2, $b$ is 4, X is chlorine, $n$ is 1 and Y is chlorine in position 5.

8. The method of claim 2 wherein $a$ is 2, $b$ is 4, X is chlorine, $n$ is 1 and Y is chlorine in position 5.

9. The method of claim 3 wherein $a$ is 2, $b$ is 4, X is chlorine, $n$ is 1 and Y is chlorine in position 5.

10. A fungicidal composition comprising a fungitoxic amount of 1-(1',1',2',2'-tetrachloroethylthio)-5-chloroindazole and an inert carrier therefor.

* * * * *